United States Patent [19]

Nishikubo et al.

[11] Patent Number: 4,564,657

[45] Date of Patent: Jan. 14, 1986

[54] RAPIDLY CURABLE ACRYLIC ADHESIVE COMPOSITIONS FOR BONDING POLYPROPYLENE

[75] Inventors: Toshihiko Nishikubo, Tokyo; Kazuo Shimizu, Iwakunishi, both of Japan

[73] Assignee: Sanyo Kokusaku Pulp Co., Ltd., Tokyo, Japan

[21] Appl. No.: 580,989

[22] Filed: Feb. 16, 1984

[30] Foreign Application Priority Data

Aug. 30, 1983 [JP] Japan ................................. 58-157230

[51] Int. Cl.$^4$ .............................................. C08L 61/20
[52] U.S. Cl. .................................. 525/158; 156/331.3; 156/333; 428/416; 428/524; 525/157; 525/301; 525/305; 525/304; 525/308; 525/309
[58] Field of Search ............... 525/158, 157, 301, 308, 525/309, 304, 305, 939; 428/416; 156/333; 524/284, 583

[56] References Cited

U.S. PATENT DOCUMENTS 3,591,438  7/1971  Toback et al. ...................... 156/310
3,832,274  8/1974  Owston .............................. 161/183
3,890,407  6/1975  Briggs, Jr. .......................... 525/157

FOREIGN PATENT DOCUMENTS 2036774  7/1980  United Kingdom .
2087906  6/1982  United Kingdom .

Primary Examiner—Theodore E. Pertilla
Attorney, Agent, or Firm—Armstrong, Nikaido, Marmelstein & Kubovcik

[57] ABSTRACT

Rapidly curable adhesive compositions suitable for bonding polypropylene, comprising a polymer of sulfochlorinated and/or chlorinated polypropylene with an average chlorine content of 26% to 34% by weight, and an average molecular weight of 5,000 to 120,000, dissolved in monomeric ingredients such as acrylic and/or methacrylic monomers.

3 Claims, No Drawings

RAPIDLY CURABLE ACRYLIC ADHESIVE COMPOSITIONS FOR BONDING POLYPROPYLENE

DETAILED DESCRIPTION OF INVENTION

This invention provides a novel composition having an excellent bond strength to the surface of polypropylene, which belongs to the adhesive compositions of the second generation acrylic adhesive type (the rapid cure acrylic adhesive composition).

The two-liquids type adhesive composition to be cured rapidly at room temperature is publicly known, for example, in Japanese examined patent publication No. Sho 53-41699 (U.S. Pat. No. 3,890,407) etc., such adhesive composition is curable in a short period by a reaction of two liquids, consisting of a chief component of adhesive and a reaction accelerator of aminealdehyde condensation product, at the time of joining together at least the surface of one adherend to which the former liquid is applied and another surface thereof to which the latter liquid is applied. Said chief adhesive is prepared by dissolving a macromolecular component, as the sulfur containing composition, which is selected from a group consisting of sulfochlorinated polyethylene and a mixture of sulfonyl chloride with chlorinated polyethylene, into another component of at least one polymerizable monomer which is selected from a group consisting of acrylic monomer and methacrylic monomer, followed by adding an organic peroxide or the like into said two components as a free radical generating agent. These are called second generation acrylic adhesives (hereinafter abbreviated as SGA) and are widely employed with many advantages (refer to, for example, Kogyo Zairyo 31, 4, p 51–55). SGA is useful as the two-liquids type adhesive compositions to be cured rapidly at room temperature to bond many substrates such as metal, glass, cloth, wood, various plastics and the like. However, in such a case of bonding that at least one substrate is non-treated or almost non-treated polypropylene such as a moulding, plate or the like all the SGAs currently in market scarcely show bond strength to polypropylene, and so they are by no means applicable thereto.

On the other hand, it has long been publicly known, for example in Japanese examined patent publication No. Sho 37-1490 etc. that particular sulfochlorinated and/or chlorinated polypropylenes show bond strengths to untreated polypropylene that are sufficiently adequate in some fields of use, and adhesive compositions which utilize this fact have been provided in many members.

As these modified polymers (chlorinated and/or sulfochlorinated polypropylene) are comparatively easily soluble into organic solvents, and moreover, have low softening points, application methods of these adhesives, which contain said polymers as an active ingredient of them, are inevitably limited by those properties.

For examples, Japanese examined patent publication No. Sho 44-9835 describes bonding by heat sealing process, while Japanese examined publication No. Sho 45-3210 and also No. Sho 47-6039 describe bonding methods which require evaporation of solvent to solidify the bonding layer.

Thus these proposed adhesives are completely unsuitable for the rapidly curable structural bonding of polypropylene, because they may not give enough bond strength for a long period after application until all the solvent should perfectly be eliminated, and they may thermally creep to debond under elevated environmental temperature.

On the other hand, it is publicly known, for example, in Japanese examined patent publication No. Sho 44-9835 etc., to endow the composition with bond strength to polypropylene by blending sulfochlorinated and/or chlorinated polypropylene with other resins. Further, in order to improve heat-resistance of adhesive layer which is composed of sulfochlorinated and/or chlorinated polypropylene, the combined uses with curable resins such as acrylics, urethanes, epoxys and the like, have been many attempted.

Although sulfochlorinated polypropylene and/or chlorinated polypropylene, having a relatively higher molecular weight and a low chlorine content, show bond strength applicable to light-duty structural uses, the compatibility of them with the other resins is remarkably poor. Therefore, many of the above mentioned compositions, proposed in aiming for the coexistence of heat resistance and bond strength to polypropylene, must use large quantities of solvents, resulting in the necessity of long-term fastening until the development of strength. Since other compositions are also greatly restricted in practice, because of their requirements for the heat press or the heat treatment at a high temperature, they are all improper as the structural adhesives at any rate.

Recently, with the striking increased use of plastics in automobiles, airplanes, bicycles and the like, there is a greater need for rapid cure type adhesives curable at a room temperature, which have light-duty structural bond strength comparable with the resistance of the materials themselves against the permanent deformation load, and are capable to join the moulding articles, the plates, the pipes, the sheets or the like of polypropylene, smoothly in the assembly line.

We have investigated aiming at the development of the rapid cure type of light-duty structural adhesives for polypropylene, curable at a room temperature as mentioned above, and have found that sulfochlorinated and/or chlorinated polypropylene are easily soluble into the monomers used generally for the manufacture of SGA, provided that the combination of molecular weight and chlorine content is confined within a particular range, and the solutions have fluidity at a room temperature even if in high concentrations. Based on these findings, said light-duty structural adhesive compositions which are curable rapidly at a room temperature and which show an excellent bond strength to the surface of polypropylene, have been completed, leading to this invention. In the following, details of the adhesive compositions of this invention will be explained.

This invention relates to the adhesive compositions which belong to the second generation acrylic adhesives type having an excellent bond strength to the surface of polypropylene. Polymer ingredients of this invention are sulfochlorinated and/or chlorinated polypropylene manufactured through the sulfochlorination and/or the chlorination of polypropylene, the molecular weight of which lies within a range of about 5,000 to about 120,000 and the chlorine content of which is about 26 to about 34% by weight.

Sulfochlorinated and/or chlorinated polypropylene, which are the polymer ingredients in the adhesive compositions of this invention, may be preferably prepared in such a way as by dissolving polypropylene uniformly into a chlorine-resistant solvent such as CCl4, allowing to react with sulfur dioxide gas and/or chlorine gas in the presence of light or radical-generating agent under the conditions of temperature of 60° to 120° C. and pressure of 0 to 2.5 kg G/cm$^2$, thereby maintaining a liquid state from beginning to end, and finally, removing the solvent by a publicly known method such as drying-up by evaporation, after the Cl and S contents have reached the desired value, respectively. The method to obtain the polymer having a molecular weight in the preferable range of about 5,000 to about 120,000, is not restricted particularly. This is attainable by the selection of the raw material, or by the publicly known degradation method, for example, by the coexistence of $O_2$ or $O_3$ with the polymer in solution before and/or during and/or after the reaction.

And yet, epoxy compound may be incorporated as a preservative stabilizing agent in amount of about 1 to 2% by weight based on the polymer prior to the removal of solvent. Further, in the case of sulfochlorinated product, it is necessary, of course, to take care lest the polymer might lose its effect through the hydrolysis of sulfochloro group during the removal of solvent and the storage of the isolated polymer.

It is necessary for the chlorine content of the polymer of this invention to lie within a range of about 26 to 34% by weight. If the use of adhesives is for light-duty adhesion to polypropylene or adhesion to pre-treated polypropylene, there may be a case in which the polymer having a chlorine content of about 40% by weight is applicable. For the purpose of this invention, however, the adhesive strength is insufficient if the chlorine content is higher than about 34% by weight. On the other hand, if the chlorine content is lower than about 26% by weight, the polymer is unacceptable, since the solubility into the monomeric ingredient used for SGA decreases significantly and the pasting workability of the adhesive composition at a room temperature becomes inferior except in the case of the polymer having an extraordinarily low molecular weight.

Also, with regard to the molecular weight of the polymer of this invention, if the molecular weight is lower than about 5,000, the cohesive force of the layer of cured adhesive is insufficient, whereas if the molecular weight is higher than about 120,000, the solubility into the monomer used for SGA decreases and the pasting workability of the adhesive composition at a room temperature becomes inferior even though the chlorine content is raised to the upper limit defined above concerning bond strength.

Therefore, these polymers are unacceptable. Sulfur content, when the polymer of this invention is a sulfochlorinated product, and the quantity of sulfonyl chloride used together with, when the polymer is a chlorinated product, may be adjusted to the same degree as those for publicly known SGA using sulfochlorinated polyethylene and/or chlorinated polyethylene, that is, to the degree in that chlorosulfonyl portion is involved in amounts of several tens of mmol.

As monomeric ingredients in the composition of this invention, it is possible to use acrylic and/or methacrylic monomer used for ordinary SGA.

The effects of the molecular weight of the above mentioned polymer (weight average, determined by means of GPC) and of the chlorine content on the solubility into the various monomers (blended 2 parts monomer to 1 part by weight polymer) are shown in Table 1. As can be seen from this table, the solubility into acrylic monomer depends almost upon the chlorine content alone, provided that the sulfur content of sulfochlorinated polypropylene is low as used in the composition of this invention and that the level of molecular weight is constant.

TABLE 1

Effect of the molecular weight and the chlorine content of polymer on the solubility into various acrylic and methacrylic monomers

| monomer | 130,000* | | | | 100,000* | | | 80,000* | | | 40,000* | 15,000* | | | | 7,000 | | | 4,000 | | | Hypalon 20 (Du Pont) |
|---|---|---|---|---|---|---|---|---|---|---|---|---|---|---|---|---|---|---|---|---|---|---|
| | | | | | | | | Cl % | | | | | | | | | | | | | | |
| | 25 | 28 | 30 | 33 | 25 | 30 | 35 | 26 | 30 | 34 | 30 | 27 | 29 | 31 | 33 | 25 | 27 | 30 | 24 | 26 | 28 | |
| methacrylic acid | X | | | | | | | X | | | | | | | | | | | | | | X |
| methyl methacrylate | | | | | X | X | Δ~ | X | X | Δ~ | | X~ Δ | | | | Δ | | | | | | |
| ethyl methacrylate | | | | | | | | X | | | | X~ Δ | Δ~ | | | | | | | | | |
| n-butyl methacrylate | | | | | | | | | | | | | | | | | | | | | | |
| n-butyl acrylate | | | | | | | | | ~ Δ | | | | | | | | | | | | | |
| i-butyl methacrylate | X | X | Δ | Δ | X | Δ~ | | X~ Δ | | | | | | | | | | | | | | |
| 1-butyl acrylate | | | | | | | | | ~Δ | | | | | | | | | | | | | |
| t-butyl methacrylate | | | | | | | | | | | | | | | | | | | | | | |
| amyl | | | | | | | | | | | | | | | | | | | | | | |

TABLE 1-continued

Effect of the molecular weight and the chlorine content of polymer on the solubility into various acrylic and methacrylic monomers

| | molecular weight | | | | | | | | | | | | | | | | | | | | Hypa- |
|---|---|---|---|---|---|---|---|---|---|---|---|---|---|---|---|---|---|---|---|---|---|
| | 130,000* | | | | 100,000* | | | 80,000* | | | 40,000* | 15,000* | | | | 7,000 | | | 4,000 | | lon 20 |
| | Cl % | | | | | | | | | | | | | | | | | | | | (Du |
| monomer | 25 | 28 | 30 | 33 | 25 | 30 | 35 | 26 | 30 | 34 | 30 | 27 | 29 | 31 | 33 | 25 | 27 | 30 | 24 | 26 | 28 | Pont) |
| methacrylate | | | | | | | | | | | | | | | | | | | | | | |
| cyclohexyl methacrylate | | | | | | Δ~ | | | | | | | | | | | | | | | | |
| cyclohexyl acrylate | | | | | | | | | | | | | | | | | ~ | | | | | |
| 2-ethylhexyl methacrylate | X | X | Δ~ | | | X | | | | | | | | | | | | | | | | |
| 2-ethylhexyl acrylate | | | | | | | | | | | ~Δ | | | | | | | | | | | |
| i-nonyl acrylate | | | | | | | | | | | ~Δ | | | | | | | | | | | |

Judgement of solubility: Blended two parts monomer to one part by weight polymer, observed after standing at a room temperature X Swellable or non-swellable and insoluble — Unsuitable for use in SGA
Δ Soluble, but gelation at a room temperature — Difficult for use in SGA
High viscous solution at a room temperature ⎫
 ⎬ Suitable for use in SGA
Fluidic solution even at a room temperature ⎭

*Sulfochlorinated PP containing 1 wt % of S

Judging from the strength of adhesion to polypropylene, which is an aim of the compositions of this invention, methacrylate esterified with highly branched alcohols, which dissolves the polymer of low chlorine content relatively well, even in the higher molecular weight region, is a preferable monomer. However, as in the case of publicly known SGA, the selection of the monomeric ingredients should be optimally done depending on each case, considering the balance of the physical properties of the cured adhesive compositions, Tg and so on, besides the dissolving power of the above mentioned polymer ingredient. Also, publicly known techniques, such as the combined use of poorly soluble monomer such as methacrylic acid, of dimethacrylate to control the cross-linking degree or the like, are applicable of course.

The preferable ratio of monomer to polymer in the compositions of this invention is 80 to 200 g monomer per 100 g polymer. If the ratio of polymer is too low, the adhesive force to polypropylene (hereinafter abbreviated to as PP) may not be exhibited sufficiently.

The constitutional ingredients in the compositions of this invention other than those mentioned above are entirely the same as those used for SGA. For example, when the polymeric ingredient is sulfochlorinated polypropylene, the chief components of the adhesive consist of polymer, monomer and free radical-generating agent, and when the polymeric ingredient is chlorinated polypropylene, further sulfonyl chloride is added to these components.

As free radical-generating agents, organic peroxide and hydroperoxide are preferable, the addition amount of which is preferably about 0.1 to 5% based on the monomer.

As sulfonyl chlorides, benzenesulfonyl chloride, p-toluenesulfonyl chloride and the like are preferable, the addition amounts of which are desirable to be 10 to 100 mmol per 100 g polymer.

And yet, in practical operation using the adhesives of this invention, it is convenient to use a two-liquid type consisting of a SGA chief component adhesive of the above mentioned composition and a reaction accelerator from amine-aldehyde condensation product. This relates to the fact that the objective of the compositions of this invention is hard bonding of polypropylene, and the operation should be carried out so that the surface of PP is wetted sufficiently with the adhesive ingredients. More concretely, (i) in the adhesion of polypropylene to other materials, the adhesive is pasted on polypropylene and the accelerator is pasted on the other substrate to join both surfaces by rubbing each other. (ii) In the adhesion of polypropylene to polypropylene, the adhesive is pasted on both surfaces and the accelerator is sprayed lightly on one of the surfaces of adhesive layers, and both surfaces are joined quickly by rubbing each other. Reproducible and high bond strength is obtained, if care is taken for the polymer ingredient in the adhesive which has adhesive power to PP to wet the surface intimately as mentioned.

In the following, examples of this invention will be shown. All the tensile shear tests were practiced with 3-5 test pieces, thus results shown in following tables are the average of 3-5 measurements.

EXAMPLE 1-4

Isotactic polypropylene having a molecular weight of about 15,000 was sulfochlorinated and chlorinated by the carbon tetrachloride solution method, and samples 1-4 having a sulfur content of about 1% by weight and a chlorine content of 27, 29, 31 and 33% by weight, respectively, were obtained. Using these samples as polymer ingredients, SGA adhesives shown in Example 1-4 were prepared employing the following formulations and procedure.

| Ingredient | Formulation I | II |
|---|---|---|
| Polymer ingredient | 100 parts by wt. | 100 |
| Monomer ingredient | | |
| (a) Isobutyl methacrylate | 90 | |
| 2-Ethylhexyl methacrylate | | 90 |
| (b) Methacrylic acid | 10 | 10 |
| Cumene hydroperoxide | 2 | 2 |

Monomer (a) is added to the polymer ingredient and dissolved under heating. After monomer (a) is dissolved uniformly, monomer (b) is added and blended uniformly. Further, after cooling to room temperature, cumene hydroperoxide (hereinafter abbreviated merely to as CPO) is added and homogenized.

As an accelerator, butylaldehyde-aniline condensation product (Noccelor 8, from Ōuchi Shinko Chemical Industries) was used. A soft steel sheet with mill scale having a thickness of 1.5 mm was cut to pieces of 15 mm width. These were burnished with No. 180 sand paper to remove the mill scale, finished with No. 320 sand paper, and stored in the desiccator as SS (soft steel) test pieces until immediately before the use for adhesion. Three types of commercial polypropylene plates A, B and C were cut similarly to about 15 mm width and employed as PP test pieces A, B and C.

PREPARATION OF JOINED TEST PIECES

PP test piece was pasted with the adhesive by rubbing, and joined to SS test piece, which had been slightly rubbed using cotton cloth impregnated with an accelerator, by rubbing each other. The lapping position was fixed in order that the bonded area amounts to about 3 cm², and the excessive adhesive was forced out through pressing with a fingertip. On leaving as it was, the adhesive hardened within a minute. After standing over 48 hours at a room temperature, tensile shear test was carried out by the use of Tensile Strength Tester Model AMU (Tokyo Tester Manufacturing Co.). Pulling speed of approximately 0.5 cm/min was used thereby.

Results are shown in Table 2 together with those of Comparative Example 1.

And yet, each chief component in the adhesive compositions had good fluidity and the workability was excellent.

COMPARATIVE EXAMPLE 1

Using commercial SGA (Sumikit SG-150F, from Taoka Chemical Co.), test pieces as in Examples 1-4 were joined conforming to the procedure specified by the manufacturer, and tensile shear test was practiced under the same conditions as in Examples.

| | | Adherend | | | |
|---|---|---|---|---|---|
| | Polymer | ppA | ppB | ppC | SS |
| | Monomer | SS | SS | SS | SS |
| Example | | | | | |
| 1 - I | Sample 1 IBMA | 99* (37) delamination | | | above 350 |
| 2 - I | Sample 2 IBMA | 95* (37) delamination | 48 Yield (19) delamination | 54 Yield pp Break | 290 delamination |
| 2 - II | Sample 2 2EHMA | | | 54 Yield pp Break | 292 delamination |
| 3 - I | Sample 3 IBMA | 98* (36) delamination | | | above 330 |
| 4 - I | Sample 4 IBMA | 91* (35) delamination | 42 Yield (14) delamination | 56 Yield pp Break | above 350 |
| 4 - II | Sample 4 2EHMA | | | 56 Yield pp Break | 330 delamination |
| Comparative Example 1 | Commercial SGA | 23 (7) delamination | 40 (12) delamination | 43 Yield (15) delamination | above 430 (>150) |

Each value shows a maximum load in kg on the stress-strain chart of the tests.
"Above" means such a case wherein break could not occur under the indicated load because of the slip of clamp.
"Yield" means such a case wherein delamination or pp break occurred after pp had been elongated to a limit.
Value in bracket shows an apparent tensile shear strength in kg/cm².
*Inside of the debonded portion of pp exhibits a white scumble which is the proof of internal destruction of the material.
Atmospheric temperature at the time of measurement: 15-18° C.

pp test piece A (Noblen BC3D, from Mitsubishi Oil and Chemical Co., surface-wetting tension 33 dyne/cm) is a plate of a general purpose moulding grade filled with low amounts of pigment. The thickness of the plate is 2.8 mm and the plate was cut to 15 mm width. pp test piece B (Noblen BC8D, from Mitsubishi Oil and Chemical Co., surface-wetting tension 35 dyne/cm) is a slightly hard elastic pp plate filled with carbon black. This guide is for use in automobile bumper, made of polypropylene. The thickness is 2.9 mm and the plate was cut to 15 mm width.

pp test piece C (surface-wetting tension 32 dyne/cm) is also a slightly soft pp plate filled with carbon black. This grade is also for use in polypropylene bumper. The thickness if 2.0 mm and the plate was cut to 15 mm width.

In Table 2, with regard to pp test piece C, the maximum load in kg itself is almost the same either in Examples or in Comparative Example.

In Examples, however, the joined portion is not destroyed even when the material reaches to yield and breaks, whereas, in Comparative Example, an adhesive failure occurs under the yield load of the material. From this fact, the superiority of the compositions of this invention is valid.

Also, regarding pp test piece B which has medium degrees of bondability, the apparent difference of figures is small. However, in Examples, the failure occurs via the propagation of the elongation to joined portion, after yield of the material, whereas, in Comparative Example, the failure occurs before the deformation of the material.

The effects of the compositions of this invention is the most significant when using pp test piece A, the surface-wetting tension of which is small and the adhesion to which is the most difficult commonly.

As mentioned above, the adhesives in Examples provide adequate bonds with tensile shear strength exceeding the irreversible deformation strength of all pp substrates tested, and can be said to have the sufficient bond strength to pp in practice.

EXAMPLE 5 AND COMPARATIVE EXAMPLE 2

Using the same adhesive as in Example 2-I, joined test pieces were prepared by the same procedure. In order to test at a constant temperature and a constant speed, tensile shear test with Tensilon UTMIIIL (Toyo Measuring Instrument Co.) was carried out in a room regulated at 20° C. and 60% RH, using load cell having a full scale of 100 kg.

Joined test pieces were prepared using the same commercial SGA as in Comparative Example 1. These were put to the test at the same time with the Example 5 and the results are shown in Table 3 designating as Comparative Example 2. Test conditions in this case are, the test piece width of 10 mm, the bonded area of 2.1 to 2.5 cm² and the pulling speed of 10 mm/min.

TABLE 3

| | | Adherend | |
|---|---|---|---|
| | Polymer Monomer | ppA SS | ppB SS |
| Example 5 | Sample 2 IBMA | 57 (26) delamination | 43 Yield pp Break |
| Comparative Example 2 | Commercial SGA | 12 (5) delamination | 8 (3) delamination |

Each value shows a maximum load in kg on the stress-strain chart of the tests.

"Yield" means such a case wherein the material showed yield state.

"Break" means such a case wherein the material broke after yield.

Value in bracket shows an apparent tensile shear strength in kg/cm².

EXAMPLE 6

Using the same adhesive as in Example 1-I, joined pieces of pp test piece A, B or D with SS were prepared by the same procedure. The width of all pieces is about 15 mm and the bonded area is 3.0 to 3.2 cm².

pp test piece D (surface-wetting tension 35–41 dyne/cm) is a plate filled with no pigment. The thickness is 2.0 mm. This is a substrate by which the results are dispersive because of a large variety of the property in each section.

EXAMPLE 7

Sample 2, in Example 1-4, 100 parts by weight was dissolved into 90 parts methyl methacrylate, and 10 parts methacrylic acid was added. To this, 4 parts CPO was added and homogenized to use as an adhesive in Example 7. Using this, joined test pieces of pp test piece A, B or D with SS were prepared by the same procedure as in Example 1-4. The width of all pieces is about 15 mm and the bonded area is 3.0 to 3.5 cm².

EXAMPLE 8

Isotactic polypropylene having a molecular weight of about 160,000 was dissolved into carbon tetrachloride. After it was degraded to some degree under the co-existence of chlorine and oxygen, it was sulfochlorinated in the usual way, and during the post-chlorination, samples were drawn out one after another. In this way, samples of sulfochlorinated polypropylene 5, 6 and 7 were obtained, which have a molecular weight of about 100,000, a sulfur content of about 1.5% by weight and a chlorine content of 25, 30 and 35% by weight, respectively. Sample 5 could not be used in SGA adhesive because of the inferior solubility into the monomer. Sample 6 of 100 parts by weight was dissolved into a mixture consisting of 90 parts isobutyl methacrylate and 40 parts cyclohexyl methacrylate under heating, and further, 10 parts methacrylic acid was added. After standing to room temperature, 5 parts CPO was added and homogenized to use as a SGA adhesive in Example 8. Although this adhesive was slightly difficult for the pasting operation because of the higher viscosity, joined pieces were made using pp test piece A, B or D conforming to the procedure in Example 1-4. The width of pieces is 15 mm and the bonded area is 2.7 to 3.4 cm².

COMPARATIVE EXAMPLE 3

In the same way as in Comparative Example 1, joined pieces of pp test piece A or D were made using commercial SGA. The width is 15 mm and the bonded area is 2.9 to 3.1 cm². After standing the test pieces in Example 6, 7 and 8 and in Comparative Example 3 at a room temperature for 48 hours after adhesion, tensile shear test was carried out with Tensilon at a pulling speed of 10 mm/min under the conditions of 20° C. and 60% RH.

Results are summarized in Table 4.

TABLE 4

| | | Adherend | | |
|---|---|---|---|---|
| | Polymer Monomer | ppA SS | ppB SS | ppD SS |
| Example 6 | Sample 1 IBMA | above 100* *No failure | 66 Yield pp break | 72 (26) delamination |
| Example 7 | Sample 2 MMA | 84 (25) delamination | 72 Yield pp break | 85 (40) delamination |
| Example 8 | Sample 6 IBMA CHMA | 90 (28) delamination | 64 Yield pp break | 62 (23) delamination |
| Comparative Example 3 | Sumikit SG-150 F | 19 (7) delamination | | 30 (10) delamination |

Each value shows a maximum load in kg on the stress-strain chart of the tests.

"Above" means such a case wherein the test was interrupted because of going over the upper limit of the load cell.

"Yield" means such a case wherein pp showed yield state.

Value in bracket shows an apparent tensile shear strength in kg/cm².

In cases of adhesives used in Example 6 and 7, starved joints occurred partially because of the slightly lower viscosity of the adhesives, and in the case of adhesive used in Example 8, pasting unevenness occurred also resulting in starved joints because of the slightly higher viscosity of the adhesive. Therefore, the results of three measurements are somewhat scattered in these cases, but the values lie on a far higher level compared with those using conventional SGA.

EXAMPLE 9

Isotactic polypropylene having a molecular weight of about 100,000 was chlorinated uniformly by the carbon tetrachloride solution method to obtain chlorinated polypropylene sample 8 having a chlorine content of 29% by weight. Using this polymer, SGA adhesive was prepared by the same procedure as in Example 1-4, conforming to the formulation mentioned below.

| Polymer ingredient | 100 parts by wt. |
| --- | --- |
| Monomer ingredient | |
| Isobutyl acrylate | 82 |
| Ethyleneglycol dimethacrylate | 8 |
| Methyl methacrylate | 10 |
| p-toluenesulfonyl chloride | 6 |
| Cumene hydroperoxide | 2 |

The preparation method of test pieces and joined pieces, was as in Example 1–4. Thereby, the workability was slightly inferior because of the high viscosity of the adhesive.

EXAMPLE 10

Sample 6 in Example 8 of 34 parts by weight and sample 2 in Example 1–4 of 66 parts were dissolved into a mixture of 82 parts isobutyl methacrylate and 8 parts ethyleneglycol dimethacrylate under heating. After added 10 parts methacrylic acid, mixed uniformly, and allowed to cool, 2 parts CPO was added at a room temperature to prepare SGA adhesive used in Example 9. The preparation of the joined test pieces was followed as in Examples 1–4. The fluidity of the adhesive was moderate and the workability was excellent.

COMPARATIVE EXAMPLE 4

Test pieces were made as in Comparative Example 1, and the tensile shear test was carried out together with the test pieces in Example 9 and 10 under the same conditions as in Examples 6, 7 and 8. These results are shown in Table 5.

TABLE 5

| | | Adherend | |
| --- | --- | --- | --- |
| | Polymer | ppA | ppB |
| | Monomer | SS | SS |
| Example 9 | Sample 8 | 62 (23) | 65 Yield (25) |
| | IBMA | delamination | delamination |
| Example 10 | Sample 6 1 part + | 60 (24) | 66 Yield |
| | Sample 2 2 parts | delamination | pp break |
| | IBMA | | |
| Comparative Example 4 | Commercial SGA | 31 (13) delamination | 22 (8) delamination |

COMPARATIVE EXAMPLE 5

We tried to dissolve samples 5, 6 or 7 in Example 8 of 100 parts by weight into a mixture of 83 parts methyl methacrylate and 2 parts 1,3-butanediol methacrylate, respectively. Thereby, samples except sample 7 were only slightly swellable. Sample 7 having a chlorine content of about 35% and a sulfur content of 1.5% by weight was dissolved uniformly into the above monomer mixture under heating. After adding 15 parts methacrylic acid, mixing uniformly, and allowing to stand, 3 parts CPO was added at a room temperature to make an adhesive in Comparative Example 5.

COMPARATIVE EXAMPLE 6

Using sulfochlorinated polyethylene (Hypalon 20, from Du Pont), SGA adhesive was prepared by the same procedure as in Comparative Example 5. This showed slightly higher viscosity. pp test piece D was cut to a width of 10 mm to make a lap joint of about 2 $cm^2$ with the SS test piece, using the above described two adhesives respectively by the same procedure as in Examples 1–4.

Tensile shear test was carried out with Tensilon at a pulling speed of 10 cm/min under the conditions of 20° C. and 60% RH.

Results are shown in Table 6.

As can be seen from these results, SGA type adhesive may be formulated even with the high molecular weight polymer and is effective in the adhesion of SS/SS, if the chlorine content is high. With regard to the adhesion of pp/SS, however, this adhesive shows only minor superiority and is not so significant in practice as publicly known SGA type in Comparative Example 6 which includes sulfochlorinated polyethylene as a polymer ingredient. This fact is due to the higher chlorine content of Sample 7, accordingly to the lower adhesive power to pp.

TABLE 6

| | | Adherend | |
| --- | --- | --- | --- |
| | Polymer | ppD | SS |
| | Monomer | SS | SS |
| Comparative Example 5 | Sample 7 MMA | 26 (13) delamination | Above 100* Scale over |
| Comparative Example 6 | Hypalon 20 MMA | 20 (10) delamination | Above 100 Scale over |

*Weak to the impact

COMPARATIVE EXAMPLE 7 AND 8

Sulfochlorinated polypropylene samples 9 and 10 having a sulfur content of about 1% by weight and a chlorine content of 25 and 28%, respectively, were prepared from polypropylene having a molecular weight of about 4,000 by the same procedure as in Examples 1–4. Using these as polymer ingredients, SGA adhesives in Comparative Example 7 and 8 were made conforming to the formulation in Example 1-I. Joined test pieces were made as in Examples 1–4 to put to the tensile shear test similarly. Results are shown in Table 7.

If the molecular weight of the polymer ingredients is too low, the cohesive force of the cured adhesive layer becomes insufficient, resulting in disadvantage in practice.

TABLE 7

| | | Adherend | |
| --- | --- | --- | --- |
| | Polymer | ppA | SS |
| | Monomer | SS | SS |
| Comparative Example 7 | Sample 9 IBMA | 38 (13) delamination | 162 (56) delamination |
| Comparative Example 8 | Sample 10 IBMA | 32 (11) delamination | 174 (58) delamination |

What is claimed is:

1. A rapidly curable adhesive composition suitable for bonding to polypropylene comprising at least one polymer selected from the group consisting of sulfochlorinated and chlorinated polypropylene dissolved in at least one polymerizable monomer selected from the group consisting of acrylic monomer and methacrylic monomer, wherein the average chlorine content of the polymer is from 26% to 34% by weight, and the weight average molecular weight of the polymer as determined by gas permeation chromatography is from 5,000 to 120,000.

2. A rapidly curable multipart adhesive system suitable for bonding to polypropylene comprising:
 (a) a first liquid consisting of at least one polymer selected from the group consisting of sulfochlorinated and chlorinated polypropylene dissolved in at least one polymerizable monomer selected from the group consisting of acrylic monomer and methacrylic monomer, and a free-radical generating agent, wherein the average chlorine content of the polymer is from 26% to 34% by weight, and the weight average molecular weight of the polymer as determined by gas permeation chromatography is from 5,000 to 120,000; and
 (b) a second liquid consisting of a reaction accelerator which is an amine-aldehyde condensation product, wherein curing may be effected by the reaction between the two liquids.

3. The rapidly curable multipart adhesive system of claim 2, wherein the monomer is incorporated with said polymer in a ratio of 80–200 grams of monomer per 100 grams of said polymer.

* * * * *